(12) United States Patent
Bailly et al.

(10) Patent No.: US 10,816,390 B2
(45) Date of Patent: Oct. 27, 2020

(54) AIRCRAFT UNDERCARRIAGE HAVING AN ONBOARD LOAD-MEASURING DEVICE, AND AN AIRCRAFT

(71) Applicant: AIRBUS HELICOPTERS, Marignane (FR)

(72) Inventors: Stephane Bailly, Cabries (FR); Vincent Schmidt, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 310 days.

(21) Appl. No.: 16/018,264

(22) Filed: Jun. 26, 2018

(65) Prior Publication Data
US 2018/0372535 A1 Dec. 27, 2018

(30) Foreign Application Priority Data

Jun. 26, 2017 (FR) .................................... 17 70674

(51) Int. Cl.
| | | |
|---|---|---|
| *G01G 19/07* | (2006.01) | |
| *B64C 25/34* | (2006.01) | |
| *B64D 45/00* | (2006.01) | |
| B64C 27/06 | (2006.01) | |
| B64C 25/32 | (2006.01) | |

(52) U.S. Cl.
CPC .............. *G01G 19/07* (2013.01); *B64C 25/34* (2013.01); *B64D 45/0005* (2013.01); *B60T 2240/06* (2013.01); *B64C 27/06* (2013.01); *B64C 2025/325* (2013.01); *B64C 2201/108* (2013.01)

(58) Field of Classification Search
CPC ........ G01G 19/07; B64C 25/34; B64C 27/06; B64C 2025/325; B64C 2201/108; B64D 45/0005; B60T 2240/06
See application file for complete search history.

(56) References Cited

U.S. PATENT DOCUMENTS

| 3,203,234 A | 8/1965 | Westcott, Jr. et al. |
| 5,205,514 A | 4/1993 | Patzig et al. |
| 2006/0283239 A1 | 12/2006 | Leroy et al. |

(Continued)

FOREIGN PATENT DOCUMENTS

| EP | 0482289 A2 | 4/1992 |
| EP | 0482289 A3 | 7/1992 |

(Continued)

OTHER PUBLICATIONS

French Search Report for FR 1770674, Completed by the French Patent Office, dated Mar. 6, 2018, All together 7 Pages.

*Primary Examiner* — Manuel L Barbee
(74) *Attorney, Agent, or Firm* — Brooks Kushman P.C.

(57) ABSTRACT

An undercarriage having an undercarriage leg carrying at least one stub, the stub being provided with a hollow element. An onboard device comprises a bar and at least one measurement unit. The measurement unit comprises two pieces of equipment, one of the pieces of equipment comprising a measurement member and one of the pieces of equipment comprising a wall. One of the two pieces of equipment is secured to the bar and one of the two pieces of equipment is secured to the hollow element, the onboard device including a test system. The test system has movement means for imparting, on request, relative movement between the pieces of equipment in order to detect a potential malfunction and in order to generate an alert if a malfunction is detected.

16 Claims, 4 Drawing Sheets

(56) References Cited

U.S. PATENT DOCUMENTS

2013/0192903 A1  8/2013  Dubois
2017/0158311 A1  6/2017  Shue

FOREIGN PATENT DOCUMENTS

| EP | 3121576 | A1 | 1/2017 |
| FR | 1355098 | A | 3/1964 |
| FR | 2564582 | A1 | 11/1985 |
| FR | 2875598 | A1 | 3/2006 |
| FR | 2986322 | A1 | 8/2013 |
| GB | 2144225 | A | 2/1985 |

AIRCRAFT UNDERCARRIAGE HAVING AN ONBOARD LOAD-MEASURING DEVICE, AND AN AIRCRAFT

CROSS-REFERENCE TO RELATED APPLICATIONS

This application claims priority to French patent application No. FR 1770674 filed on Jun. 26, 2017, the disclosure of which is incorporated in its entirety by reference herein.

BACKGROUND OF THE INVENTION (1) Field of the Invention

The present invention relates to an aircraft undercarriage having an onboard load-measuring device, and also to an aircraft, such as a rotorcraft, for example.

2) Description of Related Art

Devices on board an aircraft are sometimes used to obtain an accurate measurement of the load on an aircraft, e.g. in order to determine its weight or the position of its center of gravity before a flight.

Some such onboard devices evaluate deformation in a portion of an undercarriage. For example, sensors measure the deformation of a deformable member in a wheeled undercarriage of an aircraft in order to deduce therefrom the load applied to that wheel.

By way of illustration, Document FR 2 875 598 describes an onboard device of that type. A bar having an eddy current sensor at one end is arranged in a wheel stub axle in order to evaluate the deformation of the wheel stub axle.

When the aircraft is standing on the ground, the wheel stub axle tends to deform. The amplitude of its deformation is a function of the weight of the aircraft. Under such circumstances, a sensor is used for evaluating the deformation, and for deducing therefrom the weight of the aircraft.

Document EP 3 121 576 describes an onboard device having optical sensors.

Document FR 1 355 098 is also known.

Independently of the way it is embodied, a sensor of an onboard load-measuring device might suffer a failure. Maintenance operations can be implemented to detect failures. For example, an operator can test the onboard device by using a lifting device to verify whether that the onboard device is delivering measurements that are correct.

Document FR 2 986 322 describes an onboard device that is used in particular for measuring the weight of an aircraft. That onboard device has a bar arranged in a wheel stub axle. One end of the bar has a first sensor providing a first measurement and a second sensor performing a second measurement. One of said sensors is used for determining information about weight through the deformation of the stub. Furthermore, processor means are connected to the first sensor and to the second sensor in order to generate an alert when the sum of the first measurement and of the second measurement is not constant.

The processor means thus tend to enable the onboard device to be monitored without requiring burdensome maintenance operations.

Documents FR 2 564 582, US 2017/158311, GB 2 144 225, and EP 0 482 289 are also known.

BRIEF SUMMARY OF THE INVENTION

The present invention seeks to provide an onboard device for measuring a load on an aircraft undercarriage, said onboard device having a test system for verifying the operation of the onboard device.

The invention thus provides an undercarriage for an aircraft, e.g. a rotorcraft. The undercarriage has an undercarriage leg carrying at least one stub. The stub carries at least one contact member. Furthermore, the stub is provided with a hollow element. The undercarriage includes an onboard device, which onboard device has a bar extending inside said hollow element from a fixed end towards a free end. The fixed end may be fixed to the stub or to the undercarriage leg.

The onboard device comprises at least one measurement unit, said at least one measurement unit comprising two pieces of equipment co-operating with each other to take a measurement relating to a distance between said bar and an inside face of said hollow element, one of said pieces of equipment comprising a measurement member forming part of a sensor arranged inside said hollow element, one of said pieces of equipment comprising a wall facing said sensor, said sensor issuing a signal that is a function of said distance.

One of said two pieces of equipment is secured to the bar and one of said two pieces of equipment is secured to the hollow element, said onboard device including a test system, said test system having movement means operating on request to impart a relative movement between said two pieces of equipment of a measurement unit, said test system having a calculator connected to the sensor, said calculator being configured to process said signal when a said relative movement is imparted in order to detect any potential malfunction of said sensor and in order to generate an alert if a malfunction is detected.

The term "end" is used below to designate the end as such of the element in question, and/or an end segment of the element in question including said end as such. By way of example, a member may be subdivided into two end segments.

Thus, the undercarriage has one or more measurement units, each measurement unit comprising a sensor housed inside the stub, each sensor being suitable for evaluating a distance and a deformation of the stub. By using measurements taken by the sensors, a calculator of the onboard device can act in conventional manner to deduce the load applied to the undercarriage along one or more axes.

The term "two pieces of equipment co-operating with each other" means that both of the pieces of equipment of a measurement unit contribute to taking the measurement in question. For example, the measurement member may be an optical member aiming at the wall. In another example, the measurement member comprises a feeler of a linear variable differential transformer (LVDT) sensor, the feeler being in contact with the wall.

Furthermore, the onboard device is provided with a test system including movement means. The term "movement means operating on request to impart a relative movement between said two pieces of equipment" means that if the movement means are operated, then the two pieces of equipment of a measurement unit perform a relative movement.

Thus, the measurement member of the sensor and/or the associated wall move(s) when the movement means are operated. At least one of the two pieces of equipment moves at least between a nominal position for use other than during test stages, and a test position. The movement means may comprise a lever or the equivalent that can be operated by a person, an automatic actuator, e.g. of the motor type, or any other means enabling the transition to be made between the nominal position and the test position.

Because of this relative movement between the two pieces of equipment of a measurement unit, the signal issued by the sensor varies. The calculator monitors this signal in order to process it, possibly while also taking other parameters into account such as the outside temperature, the attitude of the aircraft having the undercarriage, etc. In addition, the calculator compares the result of the treatment with a reference in order to determine whether the onboard device is in an operational state.

For example, the variation of the signal is converted into a difference of position for comparison with a range of theoretical values. Specifically, by carrying out tests, a person can determine the theoretical value for the difference that is to be measured, and can express this value in the form of a range of values. During a test, the calculator determines the current difference as measured by the sensor and compares it with said range of values.

Thus, the test system can make it possible for the onboard device to be tested regularly in autonomous manner in order to determine whether the onboard device is capable of performing its function with the expected performance. If not, the calculator can communicate with an alert device in order to generate an alert that is visual, and/or audible, and/or tactile, . . . .

A test may also optionally be performed on request. Depending on the variant, the test may be performed in autonomous manner, e.g. by operating a motor-driven actuator when starting the aircraft.

Optionally, the test may make it possible to identify the state of degradation of the onboard device, by comparing the measurements taken with said reference.

In an aspect, if it is found to be impossible to move one of said pieces of equipment, then the test system can deduce the presence of a malfunction therefrom. This impossibility of obtaining the desired relative movement may specifically be the result of the presence of foreign bodies, of ice, or of some abnormal mechanical deformation of the mechanical parts connecting the contact member to the structure.

In an aspect, by monitoring the signals issued by the sensors over a long period of time, it is possible to take account of wear phenomena involving the sensors and/or interface parts, in order to operate the sensors over a range expected to be unaffected, even in the presence of wear.

The undercarriage may also include one or more of the following characteristics.

In a first embodiment, said wall is a portion of said hollow element, said wall being provided with said face, and said sensor being fixed to the bar.

Optionally, said hollow element extends from a first end secured to the undercarriage leg to a second end that carries at least one contact member.

Alternatively, the stub includes a hollow strut that extends from a first end zone secured to the undercarriage leg to a second end zone that carries at least one contact member, said hollow element being fixed to said hollow strut and being arranged inside said hollow strut.

In this alternative, the hollow element is an intermediate part arranged between the bar and the strut carrying at least one contact member. Such a strut is a large part that is relatively expensive. Under such circumstances, it can be useful to use an intermediate member forming the hollow element, so as to avoid modifying an expensive member. The hollow element can also be replaced in the event of wear.

In a second embodiment, said wall is a portion of the bar, and said sensor is fixed to the hollow element.

In another aspect, and independently of the embodiment, the sensor may comprise a body and said measurement member, said measurement member comprising a rod extending from said body and carrying a feeler, said feeler being in contact with said wall, said rod being free to move in translation relative to the body along a first direction going from the sensor towards said wall. In a first version of the movement means, said movement means are configured so that the relative movement is a movement of the measurement member in translation relative to said wall.

Under such circumstances, the movement means are configured to move the feeler in translation relative to the body of the sensor. In the nominal position, the feeler is situated in a predefined position relative to the body. In contrast, in the test position, the feeler is moved relative to the body by the movement means through a predetermined distance, e.g. being moved towards the body.

In a first variant of a first version, the movement means include a finger that is movable in translation in a plane orthogonal to said first direction, said finger sliding in a slot in said body, said sensor including a shoulder in said body, which shoulder is secured to said rod, a spring member bearing against said shoulder and tending to move said finger away from said body, said finger being configured to exert a force on said shoulder so as to cause said feeler to approach said body during a movement in translation of said finger along a first way of translation.

In an aspect, the movement means may include an actuator referred to for convenience as the "finger" actuator, said finger actuator being connected to the finger in order to move said finger in translation.

Such a finger actuator may comprise a lever secured to the finger. The lever may be situated outside the stub so that it can be gripped and moved in translation by an operator.

In alternative manner, or in addition, the finger actuator may comprise a motor, by way of example but not exclusively, an electric motor, suitable for moving the finger in translation on request. Such a motor may be operated by a calculator or by a button operated by a pilot, for example.

In a second variant of the first version, said sensor comprises a body and said measurement member, said measurement member comprising a rod extending from said body and carrying a feeler, said feeler being in contact with said wall, said rod being free to move in translation relative to the body along a first direction going from the sensor towards said wall, and said movement means may include an actuator referred to for convenience as a "rod" actuator for moving said rod relative to the body.

For example, the movement means comprise an exciter device in each sensor, e.g. a solenoid, an ultrasound motor, etc. The exciter device may be controlled by the calculator to which the sensors are connected.

Optionally, the rod actuator may include a coil fixed to the body and a magnetized zone of the rod, said coil being electrically powered on request in order to impart said relative movement.

In a second version, the wall may present at least one setback and at least one bulge circumferentially in order to generate a variation in said signal during said relative movement.

The term "circumferentially" refers to a closed curve defining a surface of the wall. For example, the wall may be in the form of a cylinder on a base that is substantially circular, i.e. ignoring the setbacks and the bulges.

The movement means then make it possible to cause the sensor to turn relative to the wall, or the wall relative to the sensor. For example, the sensor may be fixed to the hollow element and the wall may be a portion of the bar that can turn about its axis. In another example, the wall is a portion of the hollow element, with the sensor being fixed to the bar and being capable of turning about its axis.

Independently of this aspect, the setbacks and the bulges form calibrated geometrical features of the wall serving to generate calibrated measurement differences on going from the nominal position to the test position. In the presence of a plurality of sensors, these geometrical features may be distributed in different ways among the various sensors.

Optionally, said sensor comprises a body and said measurement member, said measurement member comprising a rod extending from said body and carrying a feeler, said feeler being in contact with said wall, said rod being free to move in translation relative to the body in a first direction going from the sensor towards said wall.

Furthermore, the movement means may comprise a rotary actuator causing said feeler to travel over said at least one setback and said at least one bulge, said relative movement being rotary movement, said rotary actuator driving said measurement member and/or said wall of a measurement unit in rotation.

A rotary actuator may comprise a lever or the equivalent operable by a person. The lever may be situated outside the stub so that it can be gripped and moved in rotation by an operator or by interacting with a stationary part that drives a movement while the undercarriage is being operated.

The rotary actuator may also be an automatic actuator, e.g. of the motor type, or any other means capable of imparting the required relative movement.

The rotation generated by the rotary actuator enables the feeler to slide in translation relative to the body on going from a setback to a bulge, and vice versa.

In an aspect, the undercarriage may have a plurality of measurement units, and said test system may have at least one said movement means for imparting relative movement on request between the pieces of equipment of each measurement unit.

Under such circumstances, the test system may make provision for operating the sensors one after another.

For example, the wall may present one bulge or one cavity per sensor, with the bulges being mutually phase-shifted, for example.

Two sensors may also be mounted opposite ways round in accordance with the teaching of Document FR 2 986 322 so as to make it possible to monitor the sum mentioned in that document.

Furthermore, the invention provides an aircraft including at least one undercarriage of the invention.

The invention also provides a method of detecting a failure of a measurement unit of an undercarriage of the invention.

The method comprises the following steps:
using said sensor to send a signal during a said relative movement between said two pieces of equipment, one of said two pieces of equipment being moved from a nominal position to a test position;
processing said signal for comparison with a reference; and
issuing an alert when said processed signal does not correspond to said reference.

Optionally, said operation of issuing a signal with said sensor during a relative movement between said two pieces of equipment comprises the following operations:
using said sensor to issue said signal, referred to as a "first" signal, when said pieces of equipment are in the nominal position;
moving one of said pieces of equipment into the test position; and
using said sensor after said movement to issue a said signal, referred to as a "second" signal.

Said processing may include an operation of determining a difference between the first signal and the second signal.

Said comparison may include an operation of comparing said difference with a range of values for said reference.

Said issuing of an alert may be performed when said difference does not lie in said range of values.

Prior to determining a difference, the first signal and the second signal are optionally transformed in order to be unaffected by the influence of outside conditions, with this being done by taking account of auxiliary information such as the outside temperature, the speed of the aircraft, the pressure of the tire carried by the stub axle, the state of the undercarriage (retracted, extended, on the ground, in flight, etc.), the pressures in the various chambers of an actuator of the undercarriage, . . . .

BRIEF DESCRIPTION OF THE DRAWINGS

The invention and its advantages appear in greater detail from the context of the following description of examples given by way of illustration and with reference to the accompanying figures, in which.

Elements present in more than one of the figures are given the same references in each of them.

DETAILED DESCRIPTION OF THE INVENTION

Figure 1:
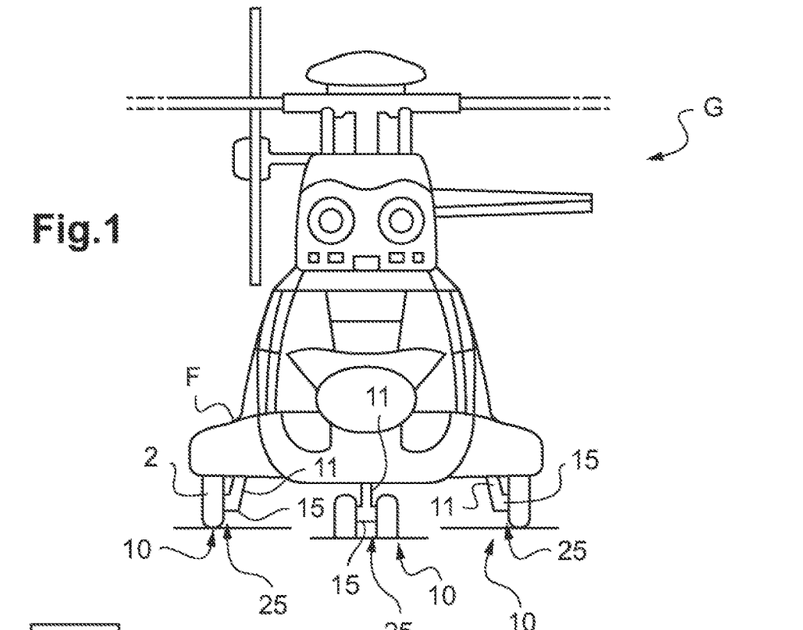
FIG. 1 is a face view of a rotorcraft having three undercarriages of the invention.

FIG. 1 is a view of a rotorcraft G of the invention, e.g. a rotorcraft having a fuselage F. On the ground, the rotorcraft G stands on two undercarriages 10 each having one member in contact with the ground and on one undercarriage 10 having two members in contact with the ground. Each undercarriage 10 is provided with an undercarriage leg 11 carrying at least one stub 15, said stub 15 carrying a contact member 2.

The undercarriages 10 shown are of the "wheeled" type, each contact member thus being a wheel, and each stub being a stub axle. Nevertheless, such a contact member could be in the form of a skid, a ski, . . . .

Under the action of the weight of the rotorcraft G, the stubs 15 of the undercarriages 10 deform. By measuring these deformations, it is possible, by calculating the load exerted on each undercarriage, to deduce therefrom the weight of the rotorcraft G and also the position of its center of gravity.

Thus, at least one undercarriage is of the type of the invention in that it possesses an onboard device 25 for measuring such deformation of a stub, and preferably all of the undercarriages are of the type of the invention.

Figure 2:
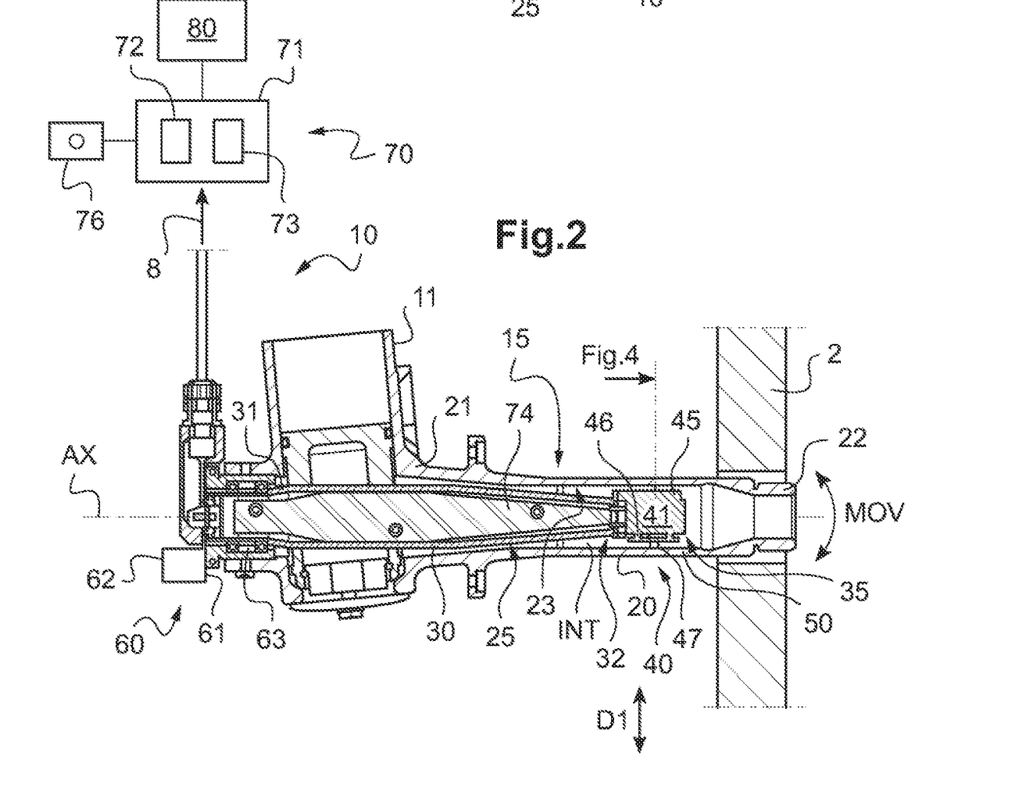
FIGS. 2 to 12 are diagrams showing undercarriages of the invention.

With reference to FIG. 2, the invention thus relates for example to an undercarriage 10 having an undercarriage leg 11 and at least one stub 15. The undercarriage leg may include a rod, a damper, an actuator, . . . .

The stub 15 extends laterally from the undercarriage leg to a contact member.

The stub 15 has a hollow element 20. In FIG. 2, the hollow element 20 may extend from a first end 21 secured to the undercarriage leg to a second end 22 carrying at least one contact member 2.

Figure 3:
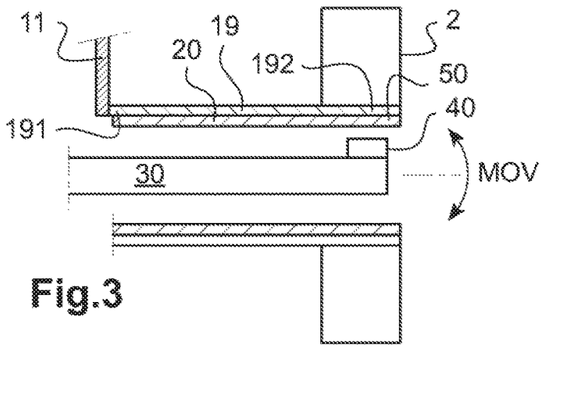

In another possibility shown in FIG. 3, the stub has said hollow element 20 and also a hollow strut 19. The hollow strut then extends from a first end zone 191 secured to the undercarriage leg towards a second end zone 192 carrying at least one contact member 2. The hollow element 20 is then fixed in the interior INT of the hollow strut, and for example specifically at the second end zone 192.

Independently of these possibilities, and with reference to FIG. 2, under the action of the weight of the aircraft on the ground, the hollow element 20 moves and/or deforms.

In this context, the onboard device 25 includes a bar 30.

The bar 30 extends in the interior INT of the hollow element 20 from a fixed end 31 to a free end 32.

The fixed end 31 in FIG. 2 is fixed to the undercarriage leg 11. Nevertheless, this fixed end 31 could be fixed to an end portion of the stub, or indeed of the hollow element 20. In contrast, the free end 32 of the bar 30 is not secured to the hollow element or to the undercarriage leg, but remains within the hollow element.

Furthermore, when no force is exerted on the hollow element 20, the hollow element 20 and the bar 30 are coaxial, for example, both extending along a common axis of symmetry AX. For example, the bar 30 and the hollow element 20 are substantially cylindrical in shape.

In contrast, when the aircraft is standing on the ground, the distance between the free end 32 of the bar 30 and the hollow element 20 varies compared with an instant when the undercarriage is not standing on the ground. This variation can be measured using at least one sensor for evaluating the load exerted on the undercarriage on the ground.

Thus, the onboard device has at least one sensor 40 suitable for measuring a distance between said bar 30 and an inside face 23 of the hollow element 20. Such a sensor 40 then includes a measurement member 45 for taking said distance measurement. The sensor may be of various forms, e.g. it may be an optical sensor.

Alternatively, but not exclusively, the sensor 40 may be in the form of an LVDT sensor. An LVDT sensor has a body 41 carrying measurement coils. In addition, the LVDT sensor has a measurement member 45 extending in part from the body 41. This measurement member 45 may thus possess a rod 46 carrying a feeler 47. The rod 46 is provided inside the body with a ferromagnetic core co-operating with the measurement coils. The rod 46 and the feeler are free to move in translation relative to the body in a first direction Dl going away from the hollow element 20 or towards it. The movement of the rod 46 in translation relative to the body 41 gives rise to a modification in the electric signal issued by the coils.

Independently of its nature, the sensor 40 may also include an electronics card 74, e.g. arranged inside the undercarriage or indeed inside the bar. This electronic card 74 is connected to the measurement coils. The electronic card 74 filters the measured data in order to send information in the form of a signal, e.g. an electric signal, to a calculator 70 via a wired and/or wireless connection 8, the information being about the measured distance. For example, this information may be in the form of a digital value, or it may be an analog value in the form of a voltage.

By way of example, such calculator 70 may comprise at least one unit 71 provided with at least one processor 72 and at least one memory unit 73. Nevertheless, the calculator could comprise, by way of example, at least one integrated circuit, at least one programmable system, at least one logic circuit, these examples not limiting the scope to be given to the term "calculator".

From the information received coming from the sensor, the calculator 70 can deduce data about the weight of the aircraft. The aircraft may have single calculator 70 or a plurality of calculator communicating with one another.

Furthermore, each measurement member 45 co-operates with a wall 50 of the undercarriage to evaluate the distance between the bar 30 and the inside face 23.

Thus, the onboard device 25 includes at least one measurement unit 35 having two pieces of equipment. One of these two pieces of equipment is a measurement member 45, and the other piece of equipment is a facing wall 50 of the sensor 40, in contact with a feeler 47 of the measurement member 45, where appropriate.

One of said two pieces of equipment is secured to the bar 30 and the other piece of equipment is secured to the hollow element 20. In a first embodiment, the wall 50 is thus a portion of the hollow element 20, the sensor 40 being fixed to the bar 30. In a second embodiment, the wall is a portion of the bar 30, with the sensor 40 being fixed to the hollow element 20.

The undercarriage 10 may have a plurality of measurement units.

In addition, at least one measurement unit may be confined in a leaktight enclosure arranged in the stub 15.

Whatever the embodiment, the onboard device includes a test system 60 in order to able to test the operation of the sensors 40.

The test system 60 may include the calculator 70. Furthermore, the test system includes movement means 61 to impart relative movement MOV between said pieces of equipment of each measurement unit, e.g. in succession or jointly.

By way of example, the movement means 61 comprise manual means that are operable directly by an operator or by interaction with a fixed part giving rise to a movement while the undercarriage is being operated, or automatic means that are controlled by the calculator.

In addition, the test system 60 may include activation means 76 connected to the calculator 70 in order to initiate a test procedure. For example, the activation means 76 comprise a button, a touch-sensitive member, a visual control member, a voice control member . . . . While the activation means are being operated by an operator, the calculator 70 deduces therefrom that a test procedure is ongoing. The calculator 70 may also be operated automatically, e.g. when the aircraft is started.

Furthermore, alert means 80 may be connected to the calculator 70.

In this context, FIGS. 2 to 12 show various ways of embodying the invention.

In FIGS. 2 to 7, the movement means 61 can impart a relative movement MOV between the two pieces of equipment of a measurement unit, which movement is in the form of a rotary movement.

With reference to FIG. 2, the movement means 61 then include a rotary actuator imparting a rotary movement to the bar 30. Under such circumstances, the movement means 61 may include a rolling bearing 63 guiding the bar 30. For example, the rolling bearing is interposed between the bar and a support secured to the undercarriage leg 11.

The rotary actuator 60 may be a manual actuator 62 or an actuator controlled by the calculator 70.

In another aspect, each sensor 40 may be fixed to the bar 30 or to the hollow element 20.

In this context, FIG. 2 shows an embodiment in which the rotary actuator is in the form of a lever 62 linked to the bar and situated outside the stub in order to be gripped by an operator or to interact with a stationary part that serves to drive movement while the undercarriage is being operated. The sensor 40 of a measurement unit 35 is fastened to the bar 30, the wall 50 being a portion of the hollow element 20. In addition, the rotary actuator takes the form of a lever situated outside the stub so that it can be gripped by an operator.

Figure 4:
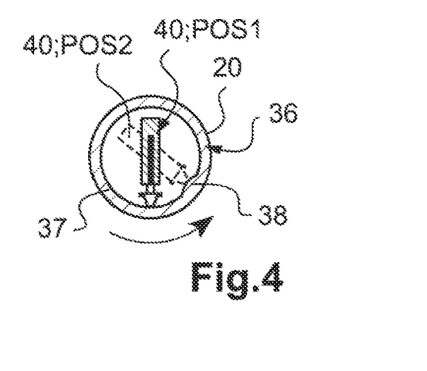

With reference to FIG. 4, the wall may then present a succession of setbacks 37 and bulges 38 around a circumference of a face 36.

In another aspect, the sensor 40 may be an optical sensor, or indeed an LVDT sensor. For example, the feeler 47 of an LVDT sensor is then in contact with a setback when it is in the nominal position, and with a bulge when it is in the test position. The distance measured by the sensor 40 thus varies between those two positions.

Figures 5, 6:
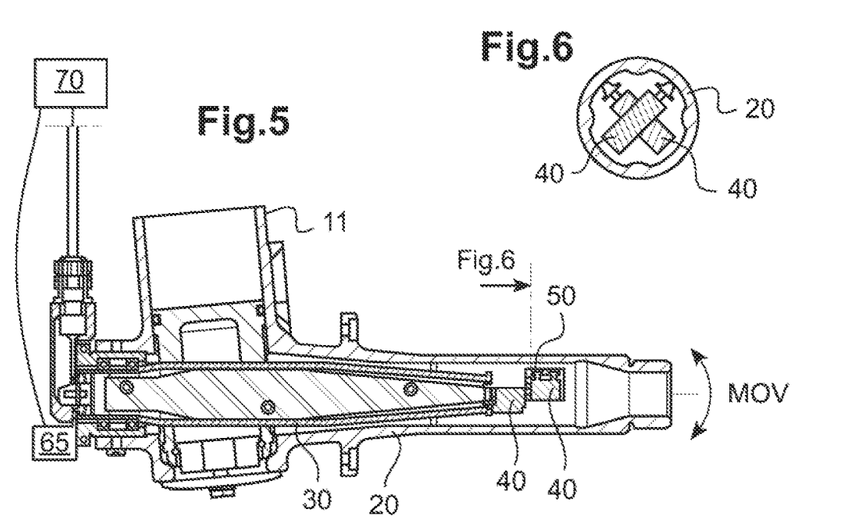

FIGS. 5 and 6 show an undercarriage 10 of the FIG. 2 type having two sensors 40 that are fixed to the bar 30. The rotary actuator is in the form of a motor 65 situated outside the stub 15 and connected to the actuator.

With reference to FIG. 6, the two sensors may be phase-offset LVDT sensors. Thus, one sensor may be in contact with a setback in the nominal position, while the other sensor is bearing against a bulge.

Figure 7:
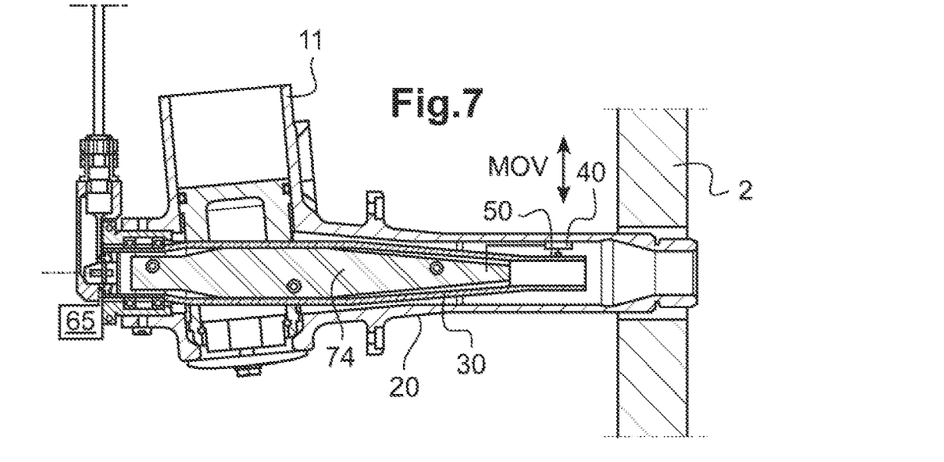

FIG. 7 shows an embodiment in which the rotary actuator is in the form of a lever 62 situated outside the stub 15 so that it can be gripped by an operator. The sensor 40 of a measurement unit is fixed to the hollow element 20, the wall 50 being a portion of the bar 30. In alternative manner, it is possible to envisage using a motor.

In another aspect, the sensor 40 may be an LVDT sensor.

In FIGS. 8 to 12, the movement means 61 may impart relative movement MOV between the two pieces of equipment of a measurement unit, which movement may be in the form of a movement of the measurement member of the sensor 40 in translation relative to the wall 50 in a first direction D1.

The movement means 61 then includes a shift actuator for imparting a movement in translation to the measurement member. The shift actuator may be a manual actuator or it may be an actuator controlled by the calculator 70.

In another aspect, each sensor may be fixed to the bar 30 or to the hollow element 20.

In this context, FIG. 7 shows an embodiment in which the sensor of a measurement unit is fastened to the bar 30, with the wall 50 being a portion of the hollow element 20. Each sensor is an LVDT sensor.

The shift actuator has a finger 66 that is movable in translation in a plane P1 orthogonal to the first way of translation D1. By way of example, this finger may slide in a longitudinal groove in the bar 30. In addition, the finger 66 may slide in a slot 42 in the body 41 of each sensor.

Figure 9:
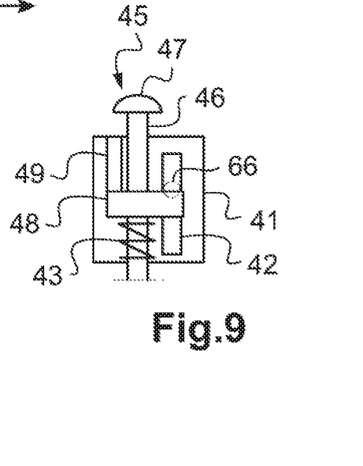

In addition, and with reference to FIG. 9, each sensor 40 includes a shoulder 48 secured to a rod 46 carrying a feeler 47. A spring member 43 bears against the shoulder 48 so as to urge the feeler 47 away from the body 41 and press the shoulder 48 against an abutment 49 of the body 41. The finger 66 is thus configured to exert a force on the shoulder 48 so as to cause the feeler 47 to approach the body 41 during a movement in translation of the finger 66 in a first direction D2.

Figure 8:
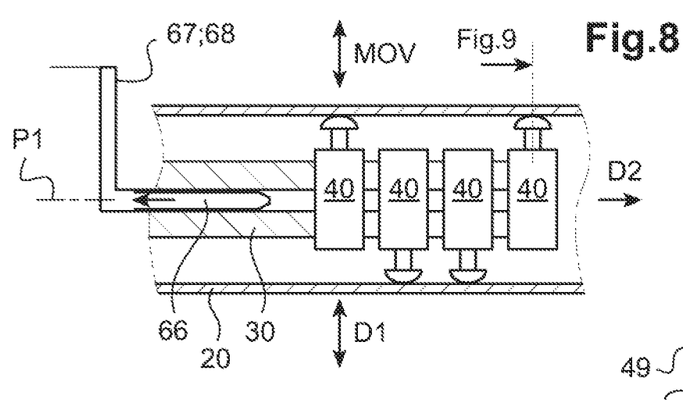

With reference to FIG. 8, when the finger 66 is moved in translation in this first way of translation, all of the feelers are moved one after another into their test positions. A movement of the finger 66 in a second way of translation opposite to the first way of translation enables the feelers to return into their nominal positions.

Furthermore, the shift actuator may be in the form of a lever situated outside the stub 15 so that it can be gripped by an operator. Nevertheless, it is possible to envisage a motor-driven finger.

Figure 10:
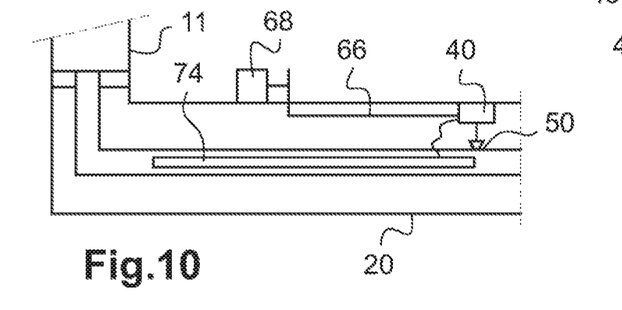

In the example of FIG. 10, such a motor-driven finger actuator 68 is used.

In addition, FIG. 10 also shows the possibility of fastening each sensor 40 to the hollow element 20.

Figure 11:
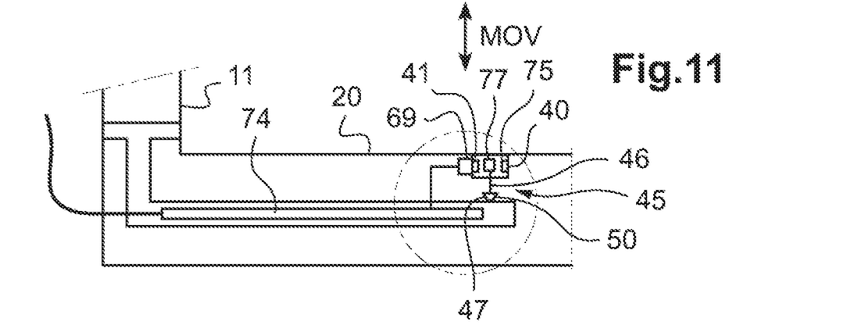

In FIG. 11, a rod actuator 69 is added to an LVDT sensor in order to move the rod 46 relative to the body 41.

For example, such a rod actuator 69 may comprise both a coil 75 fixed to the body 41 and also a magnetized zone 77 of the rod 46, the coil 75 being powered electrically by the electronic card 74 on request of the calculator in order to perform said relative movement MOV.

Figure 12:
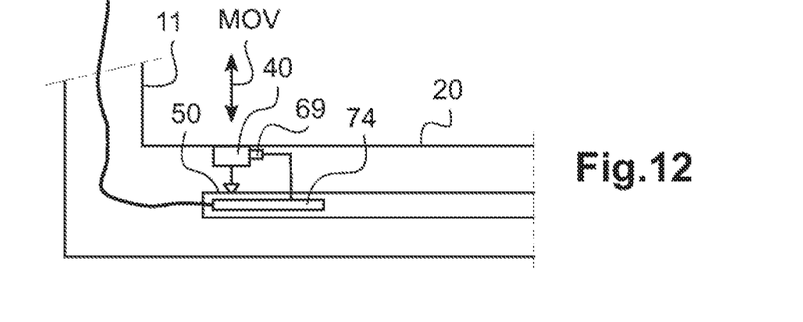

FIG. 12 shows the possibility of fixing the bar 30 to the free end of the hollow element 20.

Figure 13:
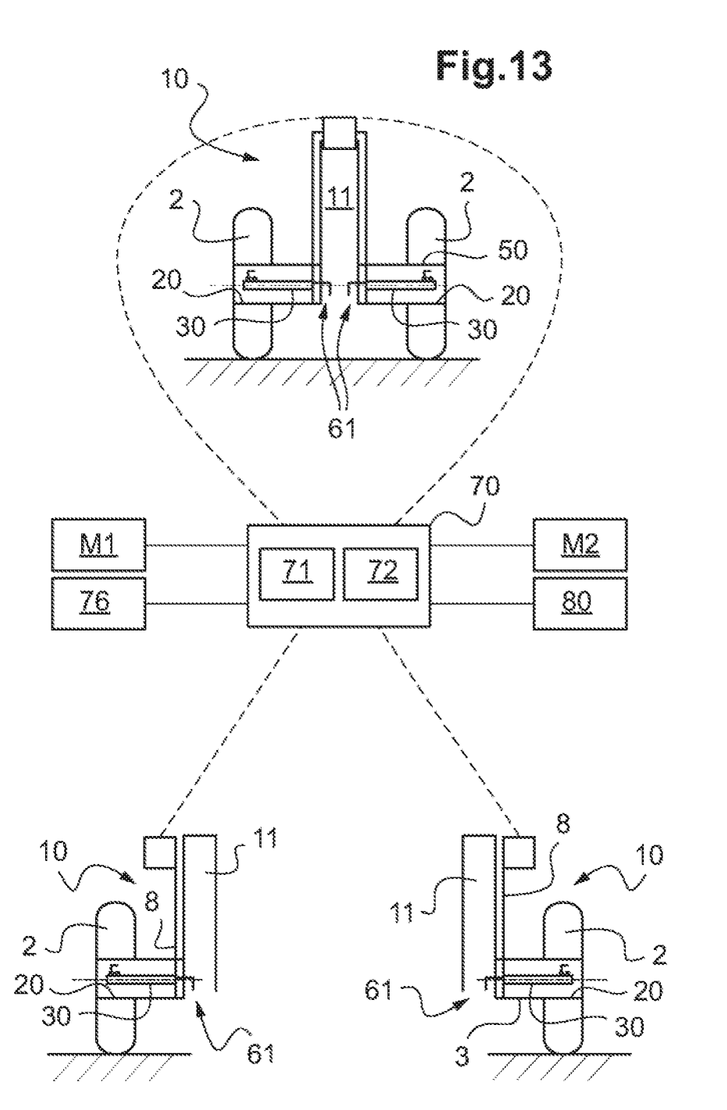
FIG. 13 is a diagram showing a load-measuring system.

FIG. 13 is a diagram showing the aircraft 1 of the invention having three undercarriages 10. Each undercarriage 10 has a hollow element 20 with a respective bar 30 inserted therein. Each undercarriage 10 is also provided with at least one sensor 40 co-operating with a wall 50. Furthermore, each undercarriage includes at least one test system 60 provided with movement means 61.

Each sensor 40 communicates with the calculator 70 via a wired and/or wireless connection. In a first variant, a cable connects each sensor directly to the calculator 70. Nevertheless, in a second variant, each sensor is connected to a wireless transceiver E, e.g. of the microwave type, arranged on the undercarriage. A transceiver powers a sensor electrically and transmits information coming from the sensor 40 to the calculator 70.

In a nominal mode of operation, the calculator determines the total weight of the aircraft and also the position of its center of gravity by conventional methods using the signals transmitted by the sensors. Optionally, the calculator may take auxiliary information into consideration as delivered by additional measurement means M1. By way of example, additional measurement means M1 transmit two secondary signals to the calculator 70 relating respectively to the pitching and roll angles of the aircraft relative to the ground. These additional measurement means M1 may comprise in particular two inclinometers, which measure the pitching and roll angles respectively, these means being dedicated specifically to this application or being constituted by any other means already present on the aircraft and performing this function.

In order to test the undercarriages, a test mode is engaged. The test mode may be engaged when starting the aircraft, or indeed on request of a pilot via activation means 76.

The movement means are then operated either by an operator or by the calculator 70, depending on the variant.

Under such circumstances, and for each undercarriage 10, each movement means moves the two pieces of equipment of a measurement unit relative to each other. The calculator 70 is then configured to process the signal issued by the sensor of the measurement unit in order to detect any malfunction and in order to manage the issuing of an alert if a malfunction is detected.

In particular, and using the method of the invention, a movable piece of equipment of a measurement unit is placed specifically in a nominal position POS1 before the beginning of the test. The sensor in that measurement unit then issues a signal, referred to for convenience as a "first" signal. The calculator can deduce a first distance therefrom, possibly while taking into consideration auxiliary information coming from the additional systems M2. Such additional systems may comprise an outside temperature sensor, a temperature sensor arranged in a stub, a sensor measuring the speed of the aircraft, a sensor measuring the pressure of the tire carried by a stub axle, a sensor giving the status of the undercarriage (retracted, extended, touching the ground, in flight, etc.), a sensor measuring the pressures in the various chambers of an undercarriage actuator, . . . .

During the test, the movable piece of equipment is moved by the movement means from the nominal position POS1 to the test position POS2.

The calculator processes the received signal for comparison with a reference and in order to issue an alert when the processed signal does not correspond to said reference. For example, alert means 80 may be connected to the calculator in order to issue said alert.

More precisely, during the relative movement imparted by the movement means, the signal issued by the sensor varies. The signal takes the form of a signal that is referred to for convenience as a "second" signal. The calculation deduces a second distance therefrom, possibly while taking said auxiliary information into consideration.

During a processing operation, the calculator can determine a difference between the first signal and the second signal, i.e. between the first distance and the second distance.

The calculator then compares this difference with a range of values for said reference, and issue an alert if the difference does not lie within said range.

At the end of the test, the pieces of equipment are returned to the nominal position.

Naturally, the invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. An undercarriage for an aircraft, the undercarriage having an undercarriage leg carrying at least one stub, the stub being provided with a hollow element, the undercarriage including an onboard device, the onboard device comprising a bar extending in the interior of the hollow element from a fixed end to a free end, the onboard device including at least one measurement unit, the at least one measurement unit comprising two pieces of equipment co-operating with each other to take a measurement relating to a distance between the bar and an inside face of the hollow element, one of the two pieces of equipment comprising a measurement member forming part of a sensor arranged inside the hollow element, one of the two pieces of equipment comprising a wall facing the sensor, the sensor issuing a signal that is a function of the distance, one of the two pieces of equipment being secured to the bar and one of the two pieces of equipment being secured to the hollow element, wherein the onboard device includes a test system, the test system having movement means operating on request to impart a relative movement between the two pieces of equipment of a measurement unit, the test system having a calculator connected to the sensor, the calculator being configured to process the signal when such relative movement is imparted in order to detect any potential malfunction of the sensor and in order to generate an alert if a malfunction is detected.

2. The undercarriage according to claim 1, wherein the wall is a portion of the hollow element, the wall being provided with the face, and the sensor being fixed to the bar.

3. The undercarriage according to claim 2, wherein the hollow element extends from a first end secured to the undercarriage leg to a second end that carries at least one contact member.

4. The undercarriage according to claim 2, wherein the stub includes a hollow strut that extends from a first end zone secured to the undercarriage leg to a second end zone that carries at least one contact member, the hollow element being fixed to the hollow strut and being arranged inside the hollow strut.

5. The undercarriage according to claim 1, wherein the wall is a portion of the bar, and the sensor is fixed to the hollow element.

6. The undercarriage according to claim 1, wherein the sensor comprises a body and the measurement member, the measurement member comprising a rod extending from the body and carrying a feeler, the feeler being in contact with the wall, the rod being free to move in translation relative to the body along a first direction going from the sensor towards the wall, and the relative movement is a movement of the measurement member in translation relative to the wall.

7. The undercarriage according to claim 6, wherein the movement means include a finger that is movable in translation in a plane orthogonal to the first direction, the finger sliding in a slot in the body, the sensor including a shoulder in the body, which shoulder is secured to the rod, a spring member bearing against the shoulder and tending to move the finger away from the body, the finger being configured to exert a force on the shoulder so as to cause the feeler to approach the body during a movement in translation of the finger along a first way of translation.

8. The undercarriage according to claim 7, wherein the movement means include a finger actuator connected to the finger to move the finger in translation.

9. The undercarriage according to claim 1, wherein the sensor comprises a body and the measurement member, the measurement member comprising a rod extending from the body and carrying a feeler, the feeler being in contact with the wall, the rod being free to move in translation relative to the body along a first direction going from the sensor towards the wall, and the movement means include a rod actuator for moving the rod relative to the body.

10. The undercarriage according to claim 9, wherein the rod actuator includes a coil fixed to the body and a magnetized zone of the rod, the coil being electrically powered on request in order to impart the relative movement.

11. The undercarriage according to claim 1, wherein the wall presents at least one setback and at least one bulge circumferentially in order to generate a variation in the signal during the relative movement.

12. The undercarriage according to claim 11, wherein the movement means comprise a rotary actuator causing a feeler to travel over the at least one setback and the at least one bulge, the relative movement being rotary movement, the rotary actuator driving the measurement member and/or the wall of a measurement unit in rotation.

13. The undercarriage according to claim 1, wherein the undercarriage has a plurality of measurement units, and the test system has at least one the movement means for imparting relative movement on request between the pieces of equipment of each measurement unit.

14. An aircraft, wherein the aircraft includes at least one undercarriage according to claim 1.

15. A method of detecting a failure of a measurement unit of an undercarriage according to claim 1, wherein the method comprises the following steps:
   using the sensor to send a signal during such a relative movement between the two pieces of equipment, one of the two pieces of equipment being moved from a nominal position to a test position;
   processing the signal for comparison with a reference; and
   issuing an alert when the processed signal does not correspond to the reference.

16. The method according to claim 15, wherein:
   the operation of issuing a signal with the sensor during a relative movement between the two pieces of equipment comprises the following operations:
      using the sensor to issue the signal, referred to as a first signal, when the pieces of equipment are in the nominal position;
      moving one of the pieces of equipment into the test position; and
      using the sensor after the movement to issue such a signal, referred to as a second signal;
   the processing including determining a difference between the first signal and the second signal;
   the comparison including a step of comparing the difference with a range of values for the reference; and
   the alert being issued when the difference does not lie in the range of values.

* * * * *